United States Patent
Chugg et al.

(10) Patent No.: US 8,576,946 B2
(45) Date of Patent: Nov. 5, 2013

(54) METHOD AND SYSTEM FOR COOPERATIVE COMMUNICATIONS WITH MINIMAL COORDINATION

(75) Inventors: Keith M. Chugg, La Canada, CA (US); Mark Johnson, Poway, CA (US)

(73) Assignee: TrellisWare Technologies, Inc., San Diego, CA (US)

( * ) Notice: Subject to any disclaimer, the term of this patent is extended or adjusted under 35 U.S.C. 154(b) by 1109 days.

(21) Appl. No.: 12/245,993

(22) Filed: Oct. 6, 2008

(65) Prior Publication Data

US 2009/0313528 A1   Dec. 17, 2009

Related U.S. Application Data

(60) Provisional application No. 60/981,452, filed on Oct. 19, 2007.

(51) Int. Cl.
*H04L 27/00* (2006.01)

(52) U.S. Cl.
USPC .......................................... 375/299; 714/752

(58) Field of Classification Search
None
See application file for complete search history.

(56) References Cited

U.S. PATENT DOCUMENTS

| | | | | |
|---|---|---|---|---|
| 4,817,093 | A | * | 3/1989 | Jacobs et al. ................. 714/728 |
| 5,303,207 | A |  | 4/1994 | Brady et al. |
| 5,396,506 | A | * | 3/1995 | Ball ............................ 372/6 |
| 5,406,586 | A | * | 4/1995 | Wang .......................... 375/343 |
| 5,650,962 | A | * | 7/1997 | Arase ......................... 365/185.3 |
| 5,812,522 | A | * | 9/1998 | Lee et al. ..................... 370/206 |
| 6,690,657 | B1 |  | 2/2004 | Lau et al. |
| 6,857,087 | B2 | * | 2/2005 | Crozier et al. ................. 714/702 |
| 6,914,560 | B2 |  | 7/2005 | Spilker, Jr. et al. |
| 7,092,457 | B1 |  | 8/2006 | Chugg et al. |

(Continued)

FOREIGN PATENT DOCUMENTS

| | | |
|---|---|---|
| EP | 1185037 A | 3/2002 |
| JP | 53117302 A2 | 10/1978 |

(Continued)

OTHER PUBLICATIONS

Carter et al., "High Throughput, Power and Spectrally Efficient Communications in Dynamic Multipath Environments" IEEE MILCOM 2003, vol. 1, (Oct. 2003), pp. 61-66.

(Continued)

*Primary Examiner* — Steve Nguyen
(74) *Attorney, Agent, or Firm* — Kilpatrick Townsend & Stockton LLP

(57) ABSTRACT

A method and system are provided in a wireless communications system comprising a plurality of nodes (users) working cooperatively. The system provides cooperative diversity by allowing nodes to actively share their antennas and other resources to obtain spatial diversity. The nodes receive the same message (information data) from a common source. Each node enhances the reliability of the message with a modern forward error correction (FEC) code, converts the FEC encoded message into an ensemble of symbols, divides the ensemble of symbols into packets, modulates, dithers and transmits the packets to a receiving node. The dithering process is performed by varying the signal amplitude, phase, frequency and/or symbol timing of the modulated packets. A unique dither pattern is assigned to each node. The receiving node captures a composite signal comprising the transmitted packets of all or most of the transmitting nodes in the cooperative communications system. Because the transmitted packets are dithered independently in phase and/or amplitude, spatial diversity is transformed into temporal diversity.

36 Claims, 15 Drawing Sheets

(56) References Cited

U.S. PATENT DOCUMENTS

| | | | |
|---|---|---|---|
| 7,127,659 B2* | 10/2006 | Richardson et al. | 714/758 |
| 7,200,184 B2* | 4/2007 | Schulz et al. | 375/303 |
| 7,346,041 B2* | 3/2008 | Eklund et al. | 370/343 |
| 7,397,863 B2* | 7/2008 | Jensen | 375/296 |
| 7,672,277 B2 | 3/2010 | Qiao | |
| 7,986,748 B2* | 7/2011 | Akkarakaran et al. | 375/296 |
| 2001/0014089 A1 | 8/2001 | Okajima et al. | |
| 2002/0136318 A1 | 9/2002 | Gorokhov et al. | |
| 2002/0197998 A1 | 12/2002 | Schmidt | |
| 2003/0063585 A1 | 4/2003 | Younis et al. | |
| 2003/0204616 A1 | 10/2003 | Billhartz et al. | |
| 2004/0004754 A1* | 1/2004 | Mailhot et al. | 359/334 |
| 2004/0022224 A1 | 2/2004 | Billhartz | |
| 2004/0096213 A1 | 5/2004 | Perkins et al. | |
| 2004/0160943 A1 | 8/2004 | Cain | |
| 2004/0230638 A1 | 11/2004 | Balachandran et al. | |
| 2005/0099983 A1 | 5/2005 | Nakamura et al. | |
| 2006/0153496 A1 | 7/2006 | Tanobe et al. | |
| 2006/0182126 A1 | 8/2006 | Yuen et al. | |
| 2008/0107044 A1 | 5/2008 | Blair et al. | |
| 2008/0198789 A1 | 8/2008 | Brown et al. | |

FOREIGN PATENT DOCUMENTS

| | | |
|---|---|---|
| JP | 2002152092 A2 | 5/2002 |
| JP | 2005538608 A | 12/2005 |
| JP | 2005538614 A | 12/2005 |
| JP | 20072018448 A2 | 8/2007 |
| WO | 03/015452 A | 2/2003 |
| WO | 2004/023665 A2 | 3/2004 |
| WO | 2004/023666 A1 | 3/2004 |
| WO | 2005/064872 A1 | 7/2005 |
| WO | 2007/125514 A | 8/2007 |
| WO | 2008/058213 A2 | 5/2008 |

OTHER PUBLICATIONS

Lee et al., "A Pragmatic Approach to Cooperative Communication," Proc. IEEE Military Comm., Washington, DC. (Oct. 2006), 7 pages.

Lee et al., "A Pragmatic Approach to Cooperative Diversity Communication" Abstract; printed on Sep. 2, 2010 from htt://www.milcom.org/2006/abstracts/1266.html; 1 page.

Lee et al., "A New Taxonomy of Routing Algorithms for Wireless Mobile Ad Hoc Networks: The Component Approach," IEEE Communications Magazine, Nov. 2006. vol. 46, pp. 116-123.

Ni et al., "The Broadcast Storm Problem in a Mobile Ad Hoc Network," MobiCom, Seattle, WA. (1999), pp. 151-162.

Ramanathan, "Challenges: A Radically New Architecture For Next Generation Mobile Ad Hoc Networks;" Proceedings of the 11th Annual International Conference on Mobile Computing and Networking Mobicom, Cologne, Germany, (2005), pp. 132-139.

International Search Report and Written Opinion for PCT Application No. PCT/US2007/083985, mailed on May 2, 2008, 15 pages.

European Search Report for EP Application No. 08253559, mailed on Mar. 19 2009; 8 pages.

Non-Final Office Action for U.S. Appl. No. 11/833,113, mailed on Jun. 22, 2009; 25 pages.

Final Office Action for U.S. Appl. No. 11/833,113, mailed on Jan. 4, 2010, 22 pages.

Non-Final Office Action for U.S. Appl. No. 11/833,113, mailed on Aug. 27, 2012; 27 pages.

Final Office Action of Jan. 31, 2013 for U.S. Appl. No. 11/833,113, 23 pages.

Notice of Allowance of Jul. 2, 2013 for U.S. Appl. No. 11/833,113, 8 pages.

* cited by examiner

METHOD AND SYSTEM FOR COOPERATIVE COMMUNICATIONS WITH MINIMAL COORDINATION

CROSS-REFERENCES TO RELATED APPLICATIONS

This application is a nonprovisional application of and claiming priority to U.S. Provisional Application No. 60/981,452 filed Oct. 19, 2007.

BACKGROUND OF THE INVENTION

There is currently great interest in enabling several radio transmitters, which are not collocated, to cooperate in communicating a message to a receiver or several receivers. This concept is known as cooperative communications and it offers several advantages including increased communication range, increased robustness to channel fading and other impairments (e.g., jamming) and robustness in multi-hop routes in networks with little or no centralized control (i.e., so called ad-hoc networks).

Cooperative communication is conceptually similar to transmission from multiple antennas that are collocated, or collocated antennas arrays (commonly referred to as antenna arrays). In this context the term collocated means that the transmitters, which may be complete radios or antennas, amplifiers and other portions of a radio, are located in close enough proximity of each other in order to enable simple, joint control of these components. Although in most abstract models the difference between collocated and non-collocated transmitters is minimal, this distinction is critically important in practice since methods developed for collocated arrays assume various levels of coordination between the transmitted signals. This distinction is illustrated in FIG. 1 through FIG. 3. In FIG. 1, a collocated array is shown, where the individual transmitters are connected by a reliable communications bus that can be used to send low-latency, highly reliable coordination communication signals. The coordination required for the collocated array is shown by a connecting line which may physically correspond to a highly-reliable and synchronized communications bus (e.g., a bus within a chassis housing several boards, wired connections on a single board, etc.).

FIG. 2 shows a coordinated non-collocated array with a method for coordination communication. This method for coordination communication is expected to be less capable than the bus shown in FIG. 1. For example, coordination communication messages in FIG. 2 may experience delay, errors, and limited data rates. FIG. 3 illustrates an uncoordinated cooperative communication system wherein each transmitter operates completely autonomously from the others and no coordination communication channel is assumed.

Coordination between multiple transmitters that are not collocated is difficult to achieve in practice. Even in approaches where the required level of coordination between transmitters is possible, the application scenario may make it prohibitive. Some specific examples of coordination include
- Knowledge of the number of transmitters with this information available at one or more transmitters and/or the receiver;
- An ordering of the transmitters known to the transmitters;
- Knowledge of the channel characteristics from a given transmitter to the receiver by one or more of the transmitters;
- Synchronization of the transmitters carrier frequency, phase, gain, and/or timing.

Different methods proposed for cooperative communications require some or all of these types of coordination as will be illustrated in the examples that follow.

When multiple transmitters send the same signal to a common receiver, they are superimposed at the receiver into a composite signal. This can result in constructive interference, in which the power of the composite signal is larger than that of any of the individual signals or it may result in destructive interference, in which the power of the composite signal has power less than one of the individual received signals. This is because radio transmissions are typically performed by modulating a sinusoidal carrier signal. When several such signals arrive at different relative phases, they create an interference pattern. If the phases of the signals are equal (or nearly equal), the signals will constructively interfere. This is commonly referred to as coherently combining the signals. The worst case scenario is that the signals arrive with opposite phases. For example, if two sinusoidal signals with the same frequency and amplitude, but with a 180 degree phase difference are combined, the composite signal is zero, i.e., this is complete destructive interference. These concepts are illustrated in FIG. 4 where the sinusoidal signals are represented by their amplitude and phase in a plane (i.e., the inphase/quadrature plane).

There are several aspects of the system that may affect the characteristics of the received signal such as amplitude, frequency, phase, etc. These include the reference phase and frequency of the transmitter and the propagation channel. The propagation channel (or, for brevity, the channel) naturally adds a phase offset due to the time it takes for the waveform to propagate from the transmitter to the receiver. The channel, in open space, typically attenuates the signal amplitude. In some cases, relative mobility between the transmitter and the receiver will cause a shift in frequency (Doppler shift). In some other cases, multiple paths for propagation (multipath) will introduce Rayleigh or Ricean fading effects. As consequence, the channel between each transmitter and the receiver will face several impairments such as signal attenuation along the transmission path, phase offset due to propagation delay, carrier frequency offset due to Doppler shift, frequency selective fading due to multipath effects.

Consider, for example, two transmitters sending the same signal without coordination. In such cases, the two signals will be superimposed with random carrier phases. This results in a probability distribution on the received signal pattern. There is some probability of constructive interference and some probability of destructive interference. If the channel and transmitter characteristics are time invariant (e.g., stable oscillators, no mobility, etc.) then the realized interference pattern will be stable. This means that the effective received signal-to-noise ratio (SNR) will be fixed and under a large number of operational scenarios, this SNR will be too small for effective communication. This will be referred to as the naïve uncoordinated method. Note that even in this case, it may be assumed that the signals are synchronized in time. This assumption may be relaxed to some extent depending on the channel model considered as will be explained later.

This suggests that coordination between transmitters is desirable for effective cooperative communication. In the ideal case, the channel characteristics from each transmitter to the receiver would be available at each transmitter. For example, transmitter 1 in FIG. 2 would have knowledge of channel 1. Each transmitter would then compensate for the channel effects (e.g., a carrier phase rotation) so each transmitted signal would arrive at the receiver aligned in phase and frequency (e.g., all arrive with zero-phase difference). In this case, perfectly constructive interference would be obtained.

This method will be referred to as distributed beam forming since it is analogous to coherent beam-forming methods in collocated arrays. In practice, not only do the transmitters need to know the channel characteristics, but the transmitter oscillators must be very stable and controlled to maintain this coherent relationship. This is often challenging even in collocated arrays, and therefore extremely challenging in the case of non-collocated transmitters. This issue is further exacerbated by the presence of mobility between transmitters and the receiver, mobility in the propagation environment, and/or the desire to have inexpensive RF circuit components.

In collocated arrays, the method of space-time coding provides an alternative to beam-forming. Specifically, space-time coding typically does not require the transmitters to know the channel characteristics from transmitter to the receiver. An example of space-time coding is the simple, effective Alamouti code. In this case, two transmitting antennas are used to send two data symbols consecutively in a coordinated manner. Specifically, transmitting antenna 1 sends the complex-baseband symbol s[1], followed by s[2]. During the same time, synchronized at the symbol time level, transmitting antenna 2 sends symbols −s[2], followed by s[1]. Here s* denotes the complex conjugate of the complex baseband symbol s. This Alamouti space-time code is an example of a code with two antennas and a block length of two symbols. By transmitting data in this manner, diversity is obtained, i.e., it ensures that destructive interference over the entire block will not occur. Note that the channels are used twice to communicate 2 symbols s[1] and s[2]. Note that transmitted signals are described in a complex baseband signal notation. The actual transmitted signal is related to the complex baseband signal by the relation: $z(RF)=Re\{z[t]exp(j2\pi f_c t)\}$ where Re(.) represents the real part of a complex variable, and $f_c$ denotes the carrier frequency. Baseband signals may generally be characterized by digital data that may have been encoded, interleaved, and/or symbol mapped, and may include frequencies that are equal to or very near zero. Passband signals or any modulated baseband signals are signals that are in the radio frequency (RF) ranges (3 kHz to 300 GHz) and can be transmitted wirelessly. Passband signals may be intermediate RF signals that will be modulated over a higher frequency for transmission or they may be RF signals that can be directly transmitted. Passband signals are often modeled mathematically as an equivalent complex-value baseband signal. In practice, a complex baseband signal can be presented in the form of $z(t)=I[t]+jQ[t]$ where $I[t]$ is the inphase signal and $Q[t]$ is the quadrature signal. The physical passband signal corresponds to $I[t]\cos(2\pi f_c t)-Q[t]\sin(2\pi f_c t)$ or $z(RF)=Re\{z[t]exp(2\pi f_c t)\}$. In the following description, passband signals, i.e., both transmitted and received modulated signals, data, or symbols, will be modeled as an equivalent complex-value baseband signal for the purpose of illustration.

Such space-time coding methods may also be considered for the case of non-collocated arrays. This method is referred to as distributed space-time coding. Distributed space-time coding thus requires several levels of coordination. First, the transmitters and the receiver must have knowledge of the number of transmitters. Second, an ordering of the transmitters must be established. This ordering is required so that the appropriate symbol sequence can be assigned to each transmitter. In the space-time coding literature, it is conventional to express the space-time code as a matrix of symbols, each row corresponding to the sequence of symbols to be transmitted. Thus, the ordering of transmitters corresponds to assigning a specific row of the space-time code matrix to each transmitter. A third level of coordination is time synchronization. The transmitters must be synchronized at the symbol time level and also must be synchronized at the space-time code block level. This level of coordination is likely easier to achieve in practice than that required for distributed beam-forming. A small loss in performance will be suffered relative to distributed beam-forming, however, since perfect constructive interference is not achieved.

The level of coordination required for distributed beam-forming and distributed space-time coding is undesirable for a number of practical systems of interest. In fact, it may be impossible to provide this level of coordination in many cases. One specific example is the case of an ad-hoc, mobile network of radios. Consider the case where one node (a node means the same as a user, a transceiver device, a mobile handset, a transmitter, a receiver, or a base station hereinafter) in such a network transmits a message (in the form of a complex baseband signal) that is received by two or more other nodes; these are hop-1 nodes. It is then desirable for these hop-1 nodes that received the initial message to cooperate to send the message to another set of nodes, i.e., hop-2 nodes. This is illustrated in FIG. 5. Consider the case when the nodes are moving and when it is necessary to disseminate the message through the network with low-delay. These requirements are consistent with applications such as emergency response and tactical squadron communications.

In this case, it is impractical or impossible for the nodes to be coordinated effectively in a rapid manner. For example, in order to coordinate for distributed space-time coding, the hop-1 nodes that successfully received the initial transmission would need to send an acknowledgement message back to the originating transmit node. This transmit node would then send a second message to indicate the number of nodes that received the initial transmission and some ordering, possibly based on identification information included in the acknowledgement messages. Since the nodes are mobile and the wireless propagation channel is inherently random, it is possible that during this round of coordination transmission errors can occur. For example, suppose 4 nodes successfully received the original transmission and sent acknowledgements, but of those 4, only 3 successfully receive the order assignment. This will result in transmission of 3 of the 4 required rows of a space-time code matrix possibly resulting in a significant loss in performance. Even if the coordination communication is perfect, it requires additional delay which is undesirable in many applications.

Using space-time beam-forming requires similar coordination communication to establish knowledge of the channel conditions at the nodes to be coordinated. Specifically, each hop-1 node would need to identify the channel from itself to a hop-2 node. Conceptually, this could be achieved with a round of coordination communication. Then, the hop-1 nodes could use distributed beam-forming to communication with a hop-2 node. This is difficult in practice because the effective channel characteristics are likely to change during this process due to factors such as node mobility and oscillator drift. Another limitation of this approach is that it may be desired to relay the message from hop-1 nodes to many hop-2 nodes, i.e., not just one hop-2 node. This is the case when, for example, it is desired to have several hop-2 nodes cooperate to send the message further out into the network. With distributed beam-forming, however, it is difficult for cooperating transmitters to simultaneously align their signals coherently at more than one node. Thus, in the scenario considered, a separate round of coordination communication and coordinated cooperative transmissions would be required for each hop-2 node. This introduces further delay and complexity.

In the given exemplary scenario, the less coordination required the better. For example, of the techniques described, one may select the naive uncoordinated method. In that case there is no coordination communication required and cooperation occurs autonomously and without additional delay. Specifically, the hop-1 nodes would simply transmit the message and the resulting composite signal would be received at each hop-2 node. The drawback with this approach is that there is a significant probability of a stable destructive combining pattern at specific nodes that will prevent successful reception.

Thus, the number of hop-2 nodes will be reduced relative to that in the case of distributed space-time coding or distributed beam-forming.

This establishes the need for a method of performing cooperative communications with no coordination, but in a manner that is robust against stable destructive interference patterns at the receiver.

BRIEF SUMMARY OF THE INVENTION

The primary problem with the naive uncoordinated method is that destructive interference is possible and when it occurs it is relatively stable. That is, when a low received signal-to-noise ratio (SNR) in the composite signal is received, it will tend to stay at a low SNR prohibiting reliable communication. If the interference pattern were to change more quickly, cycling through many random interference patterns so that the received SNR varied, then one could use a forward error correction (FEC) code to protect the information message from the worst case destructive interference.

The present invention establishes a method and system for inducing such time variation in the composite signal SNR and uses an FEC and/or an interleaver to provide the inherent diversity advantages. This is accomplished by dithering the transmitted signal parameters (e.g., amplitude, frequency, phase, symbol timing, and a combination thereof). The sequence of dithers can be generated or stored locally at each transmitter. A distinct dither pattern should be assigned to each transmitter in the cooperating non-collocated array.

In one embodiment of the present invention, the dither pattern can be generated by a pseudo-random number generator or pseudo-noise generator located in the transmitter with a distinct initialization seed associated with each transmitter. In another embodiment of the present invention, the dither pattern may be stored in a memory such as RAM (random access memory), registers, ROM (read-only memory), EPROM (erasable programmable ROM), EEPROM (electrically erasable PROM) or flash memory.

In yet another embodiment of the present invention, the dither pattern can be a software algorithm comprising microcode, program code, hardware description languages that may be stored in a machine readable medium. The microcode, program code or a code segment may be coupled to a hardware circuit. In yet another embodiment of the present invention, the pseudo-random number generator can be implemented as a linear feedback shift-register, where the initialization seed may be hardwired, stored in a ROM, EPROM, EEPROM, Flash memory, registers, software programmable, or user configurable.

FIG. 6 is a block diagram of a proposed system, according to an embodiment of the present invention. Each transceiver of the cooperative communication network comprises a receiver capable of receiving information data from the same source node (not shown), an FEC encoder to enhance data reliability, a modulator, a dithering mechanism coupled with an initialization seed (shown as dither sequence I, where I=1, ..., N). The FEC encoder may include an interleaver to rearrange the order of the encoded data so that adjacent encoded data are separated to further enhance data reliability. The modulated blocks of symbols of each transmitter are dithered with a distinct dithering pattern. In one embodiment of the present invention, the source node may apply a simple cyclic redundancy check (CRC) code or a parity check to the information data in order for the cooperative nodes to verify the correctness of the received data. The source node can also apply a more complex forward error correction code such as a Reed-Solomon block code, a convolutional code or a modern error correcting code such as low density parity-check (LDPC) or flexible low density parity-check (F-LDPC) code so that the receiving cooperative transceivers can correct errors occurred in the channel. In one preferred embodiment of the invention, the FEC code is a modern code using a rate ½ F-LDPC code. FIG. 12 is an exemplary block diagram of an F-LDPC encoder according to one embodiment of the present invention.

The cooperative communication network can be any wired or wireless networks including, but not limited to those described herein, such as power lines, WLAN, WiMAX, cellular GSM, CDMA, WCDMA, TD-SCDMA, digital audio broadcasting and digital video broadcasting networks. For example, in a cellular environment including multiple users (transceivers), the transmitting user can communicate with other transceivers with an omnidirectional antenna to achieve spatial and temporal diversity for the uplink communication. This is especially beneficial when the transmitting user is behind a building and does not have a direct communication path to a base station, whereas the other transceivers that cooperate have a line-of-sight communication with the base station, thus can relay the transmitting user's signal. In a digital signal broadcasting system including multiple broadcasting towers, a transmitter can communicate with other transmitting towers cooperatively to achieve a single frequency network for the regional or even national coverage.

In another embodiment of the present invention, each transceiver further comprises a data packetizer that divides the encoded information data into packets, each packet contains an integer amount of symbols. The packetizer may be interposed between the FEC encoder and the modulator. In another embodiment of the invention, each transceiver may contain a training pattern generator that inserts a training sequence into each packet. In one embodiment, the training sequence may be prefixed at the start of each packet. In other embodiment, the training sequence may be located at a predetermined location within each packet. In yet another embodiment, the training sequence may be interspersed within each packet. The training sequence may be the same for each transceiver in the cooperative communication system. FIG. 9 shows the packetization of a code block into an integer number of packets, with each packet contains an integer amount of symbols (containing an M-ary alphabet). The dither pattern is unique for each transceiver in the cooperative communications system and its value is held constant for a packet period of time.

In one embodiment of the present invention, a receiver receives a composite signal that can be the sum of the dithered signals emanated from each transceiver. The receiver does not need to know the number of non-collocated transceivers. The receiver uses the training sequence or a portion of it to estimate the channel response and to adjust synchronization timing for the demodulator. The demodulated symbols are then reassembled and applied to an FEC decoder for decoding.

DETAILED DESCRIPTION OF THE INVENTION

As a simple example of the benefits of the proposed approach, consider two cooperating transmitters, each sending a symbol sequence s[k], where k is the time index. Under a simple additive white Gaussian noise (AWGN) channel model, the composite signal model is $$z[k] = \{A[1,k]\exp(jP[1,k]) + A[2,k]\exp(jP[2,k])\}s[k] + w[k] \quad (1)$$

where $A[n,k]\exp(jP[n,k])$ is the complex baseband channel response from transmitter n to the receiver in amplitude-phase form (amplitude $A[n,k]$ and phase $P[n,k]$), j is the square-root of −1, exp(.) is the exponential function, and w[k] is AWGN. Note that this may be expressed as $$z[k] = C[k]\exp(jQ[k])s[k] + w[k] \quad (2)$$

where C[k] is the composite channel amplitude and Q[k] is the composite channel phase. The instantaneous SNR of the composite signal is proportional to the square of C[k].

First consider the case of naïve uncoordinated cooperative communications. In this case, the complex channel gains are not varying with time, i.e., $A[n,k]\exp(jP[n,k]) = A[n]\exp(jP[n])$. Suppose that $A[1] = A[2] = A$, then the worst case is when $P[1] = P[2] + 180$ degrees. This results in a composite amplitude of $C[k] = 0$ so that complete destructive interference occurs. The best case is $P[1] = P[2]$, in which case $C[k] = 2A$. In this best case scenario, the SNR is improved by a factor of 4 (6 dB) relative to that obtained when only one transmitter is active. In the worst case, however, an infinite loss in dB of SNR is observed since only noise is received.

Figure 7:
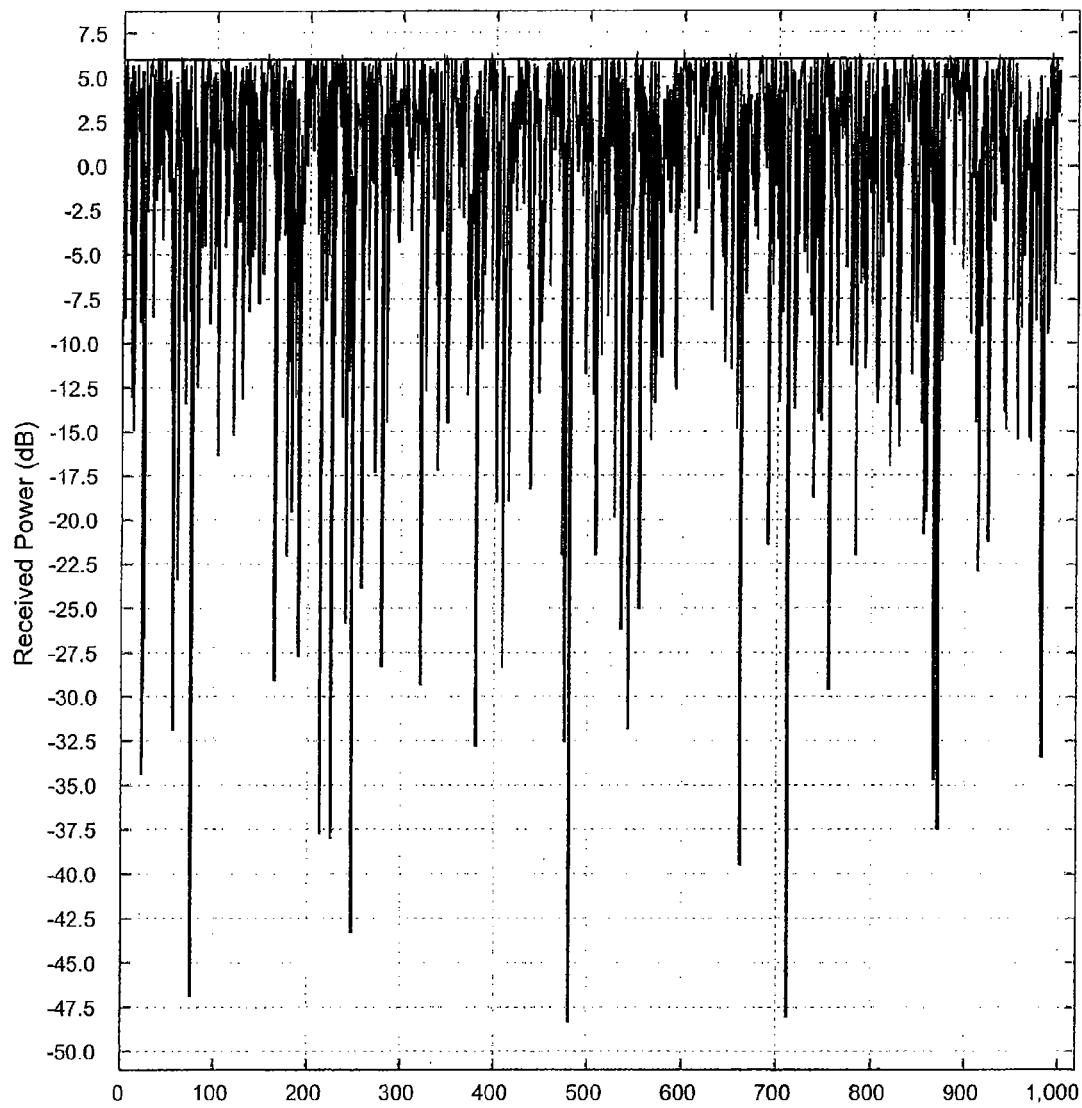
FIG. 7 shows an example of realizations of the composite signal power for two equal power signals with random phase dithering. Values are relative to one signal transmission.

Consider the same case of $A[1] = A[2] = A$, but with dithering of the carrier phase at each of the transmitters. Specifically, both transmitters dither the phase so that P[1,k] and P[2,k] are sequences of independent phase values, uniformly distributed over a phase interval of 360 degrees. The composite signal amplitude C[k] will then vary with k and is expected to take values between 0 and 2 A resulting in a range of instantaneous composite signal SNR between 6 dB and −∞ dB relative to that of one transmitter only. This is shown in FIG. 7, where the instantaneous composite signal SNR for this case is plotted in dB (relative to the one transmitter case). Also shown in FIG. 7 is the maximum possible value of the composite signal SNR, 6 dB.

With the naïve uncoordinated method, one value of this SNR, between 6 dB and −∞ dB, will be experienced for the entire period of transmission. This value will be randomly selected from the set of values shown in FIG. 7. For example, there are a number of realizations that have SNR 20 dB below that of a single transmitter. If such a realization is experienced in the naive uncoordinated method, it is likely that reliable communication is not possible.

In the present invention, however, the time-varying SNR will be observed in the received composite signal. Thus, the receiver will experience many instances of both constructive and destructive interferences. A receiver can benefit from time diversity in such time-varying channels. As a simple example, if each symbol were sent twice it would experience two different channel gains. The probability that both channel gains will experience severe destructive interference is lower than just experiencing such destructive interference on a single transmission. Thus, through phase dithering and time redundancy in the transmitted signal, one obtains diversity against destructive interference.

Repeating each symbol is a simple type of FEC. More effective FEC methods can be used to obtain better diversity with lower amounts of redundancy. Specifically, a modern or turbo-like code uses a large block size with powerful structure and is desirable to capture the maximum amount of redundancy for a given rate. The effect of obtaining more diversity is to increase the rate at which the error probability decreases with the average composite signal SNR. Specifically, with diversity, the performance is determined by the average received signal SNR instead of one particular realization of the received signal SNR as is the case in the naive uncoordinated method.

Figure 8:
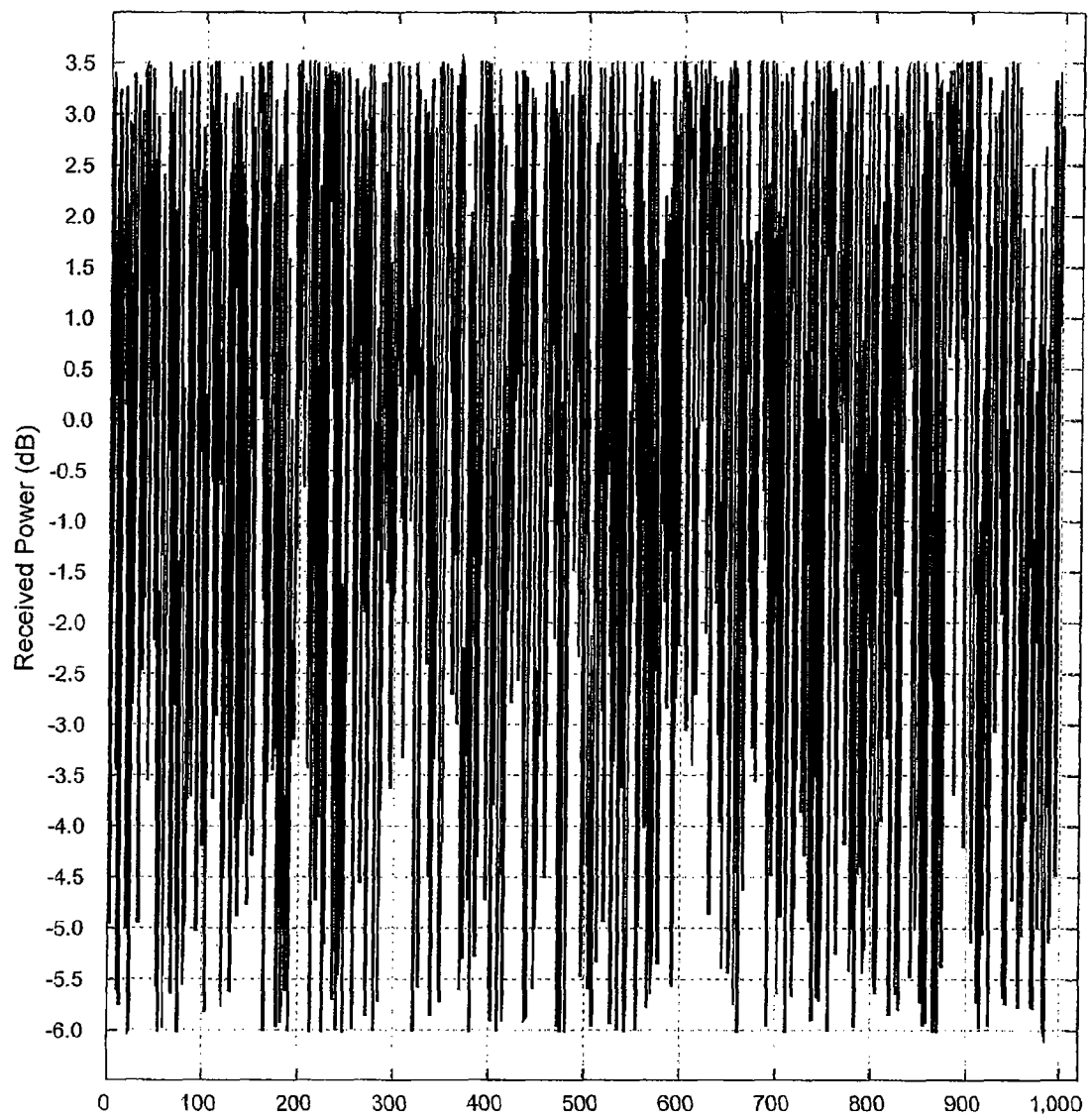
FIG. 8 shows an example of realizations of the composite signal power for two unequal power signals with random phase dithering. Values are relative to the strongest transmitted signal power.

The worst case for two signals is when $A[1] = A[2] = A$ since it can result is a complete loss of signal energy at the receiver. To illustrate this, consider the case when $A[1] = A$, and $A[2] = 0.5 A[1]$. A similar set of instantaneous SNR realizations with phase dithering is shown in FIG. 8. The SNR is measured in dB relative to just receiving the stronger of the two signals alone (i.e., this is the 0 dB level). Therefore, the maximum SNR (perfect constructive interference) is 3.5 dB and the minimum is −6 dB. Again, with phase dithering, one experiences a random fluctuation between these values in a time-varying composite signal SNR.

Figure 1:
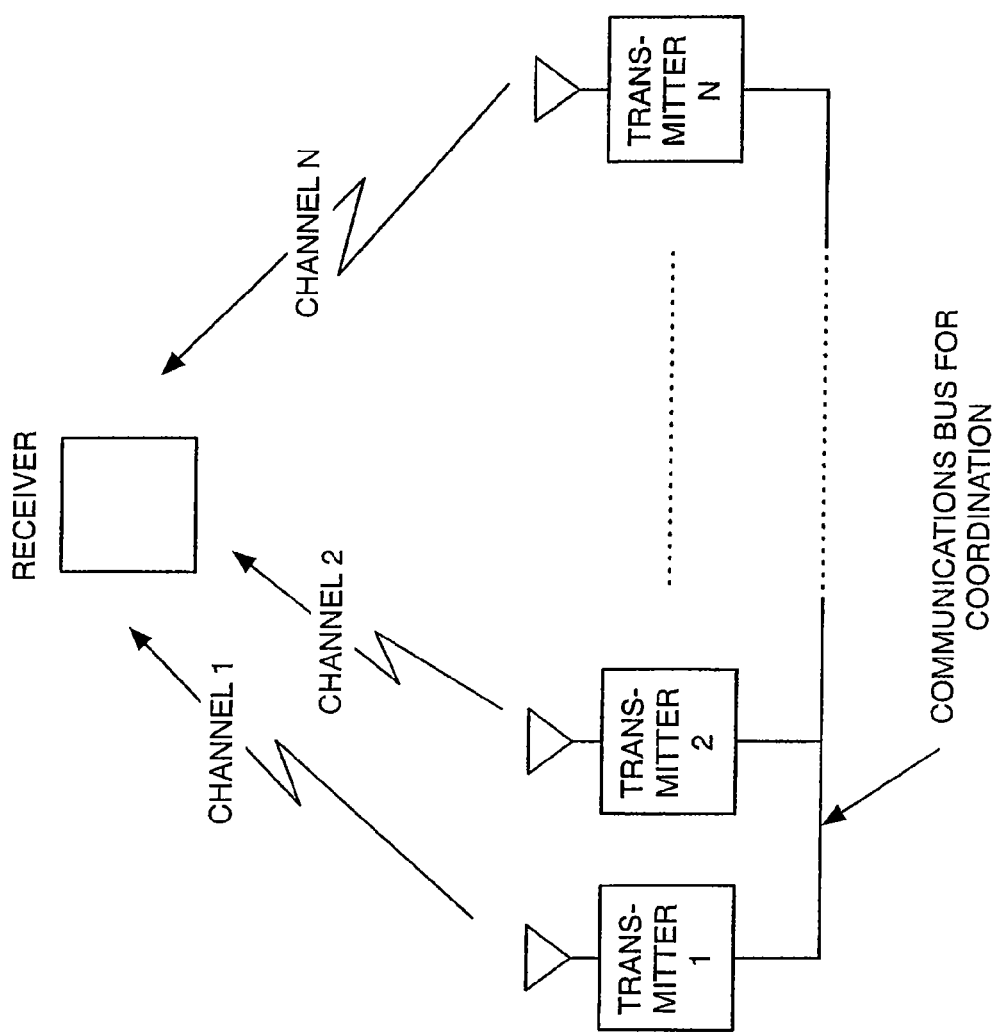
FIG. 1 shows a collocated array of transmitters with reliable coordination communication.
Figure 2:
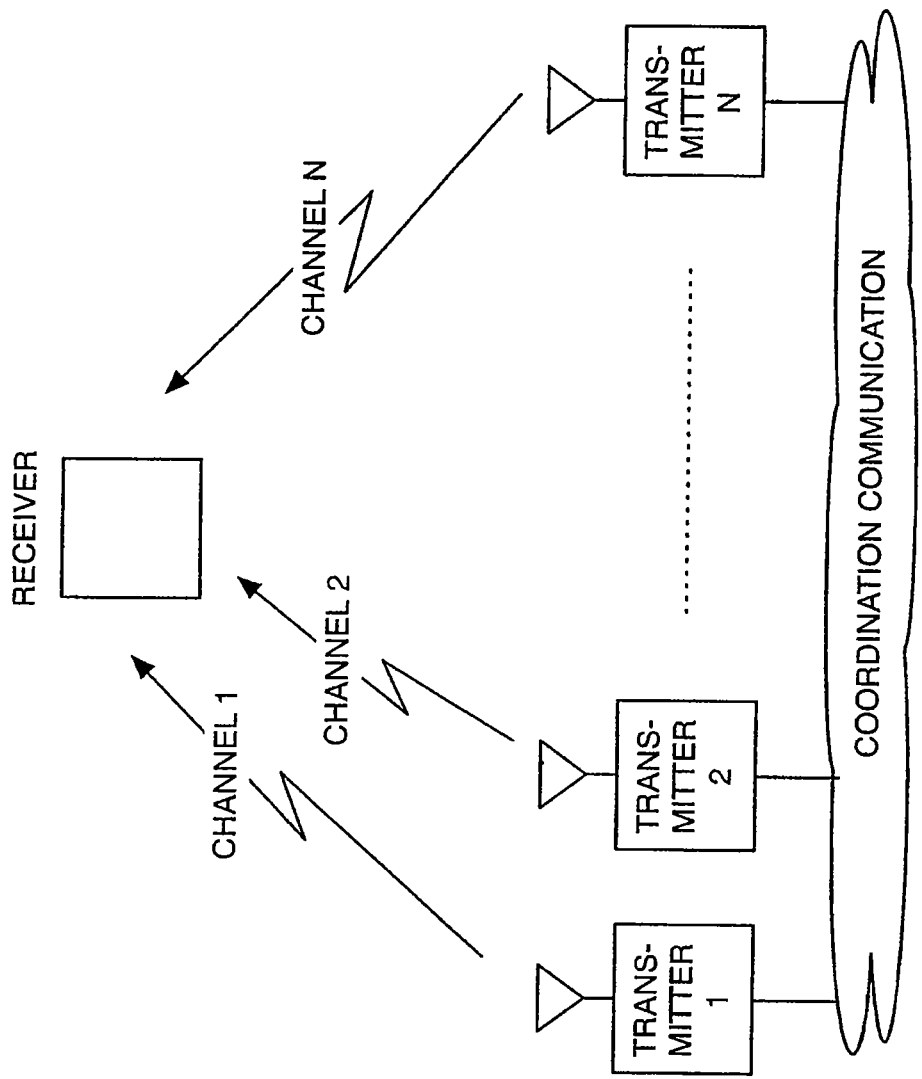
FIG. 2 shows a non-collocated array of transmitters with limited coordination communication capability.
Figure 3:
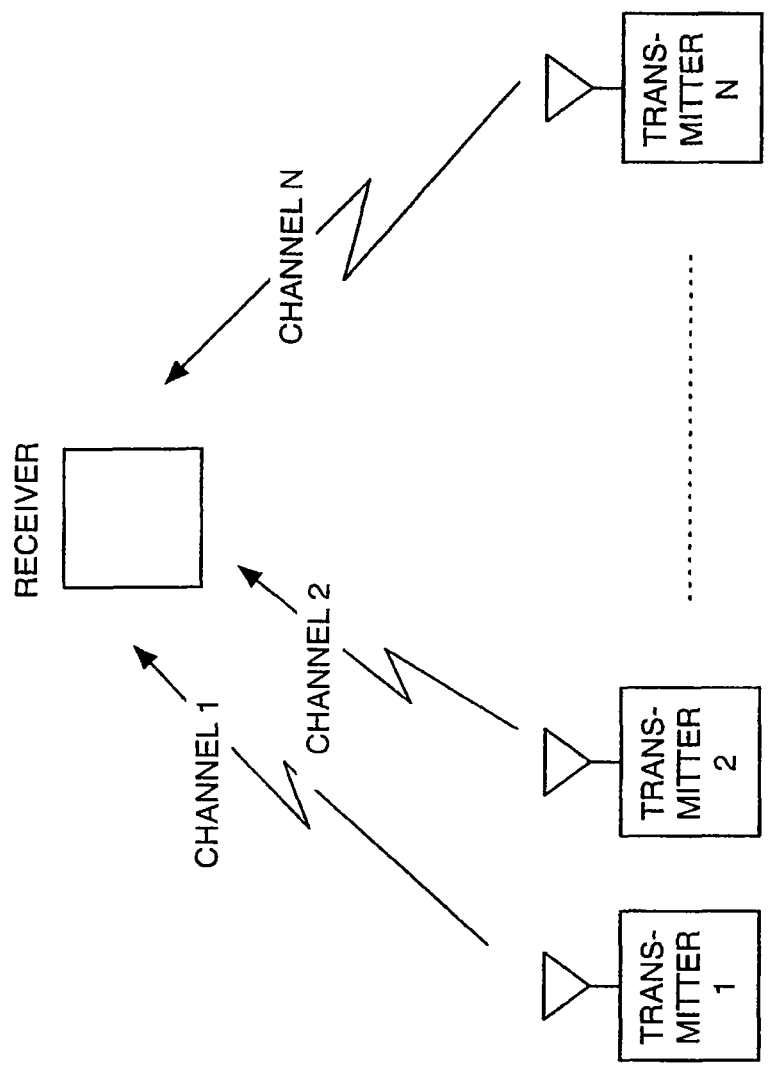
FIG. 3 shows a non-collocated array of transmitters with no coordination communication capability.
Figure 4:
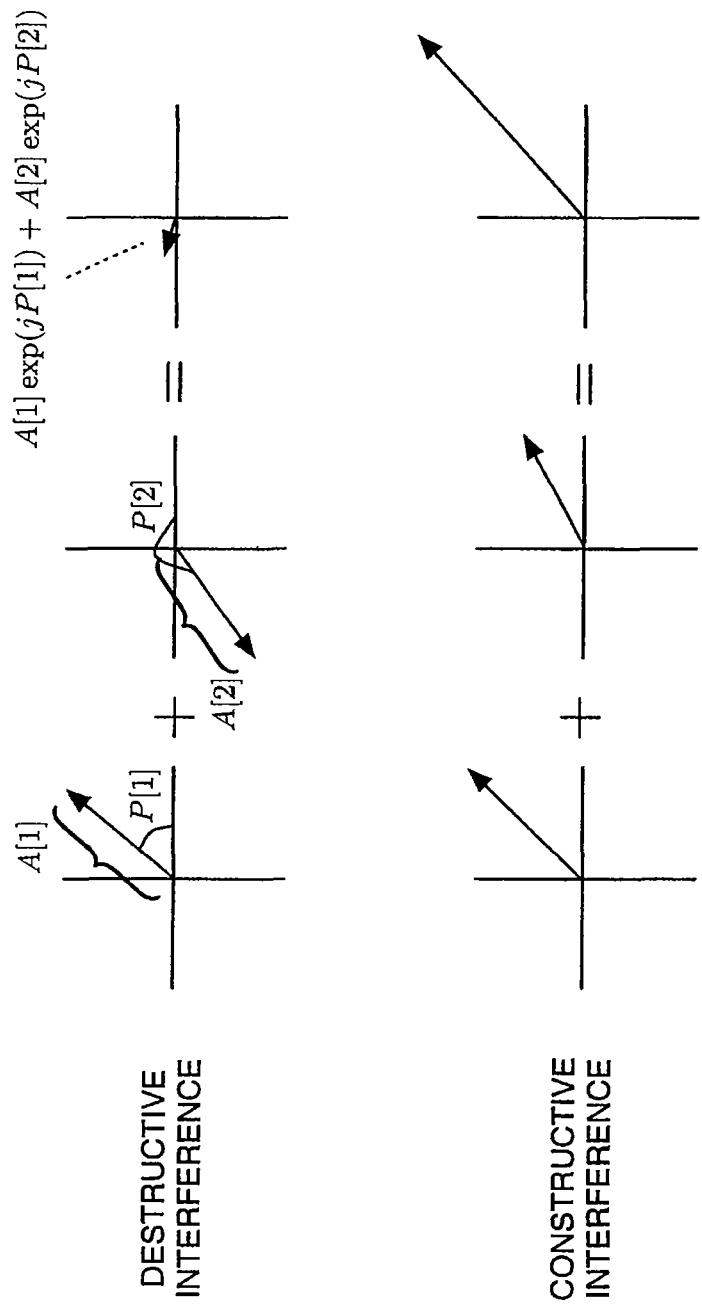
FIG. 4 shows an example of constructive and destructive interference patterns for two transmissions.
Figure 5:
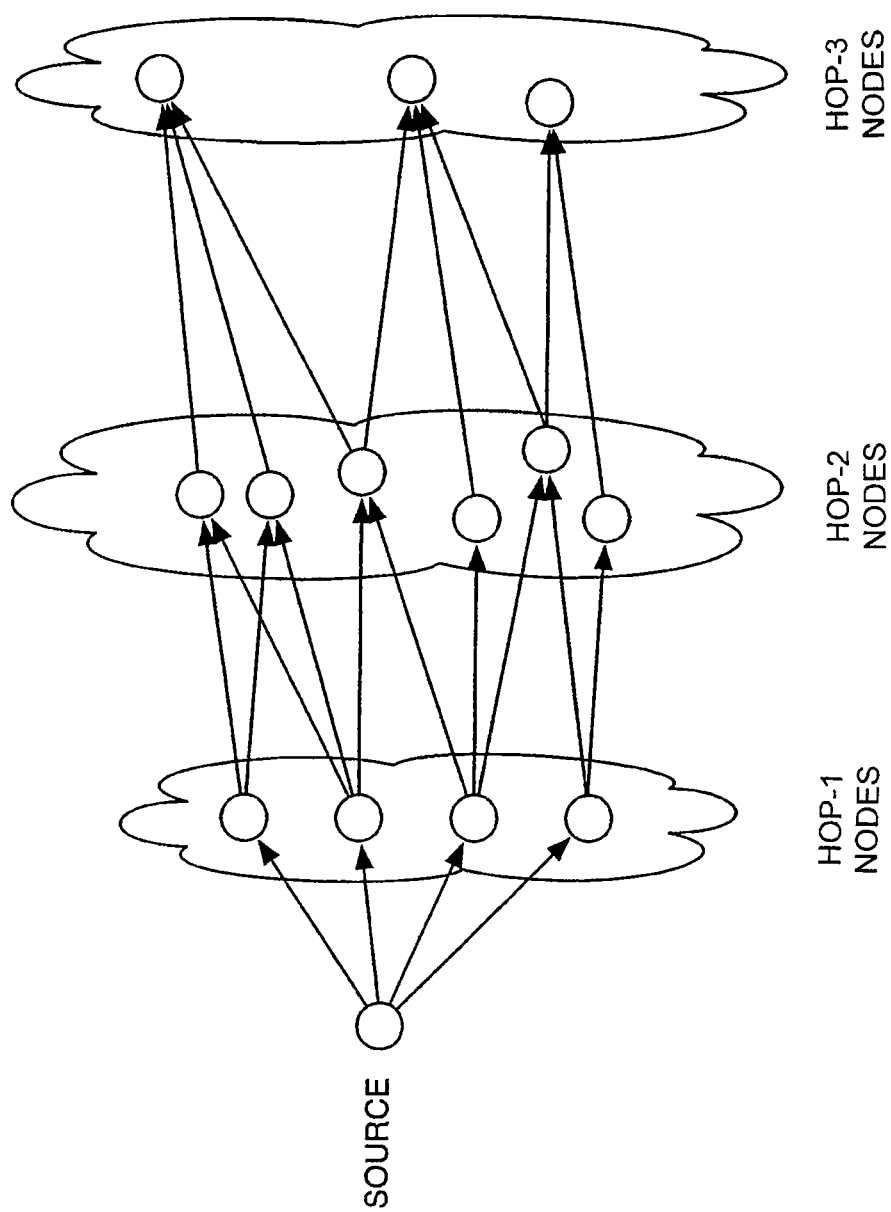
FIG. 5 shows an example of multi-hop transmission relays in a mobile ad-hoc network. Cooperative communication is illustrated by multiple arrows arriving at a node.
Figure 6:
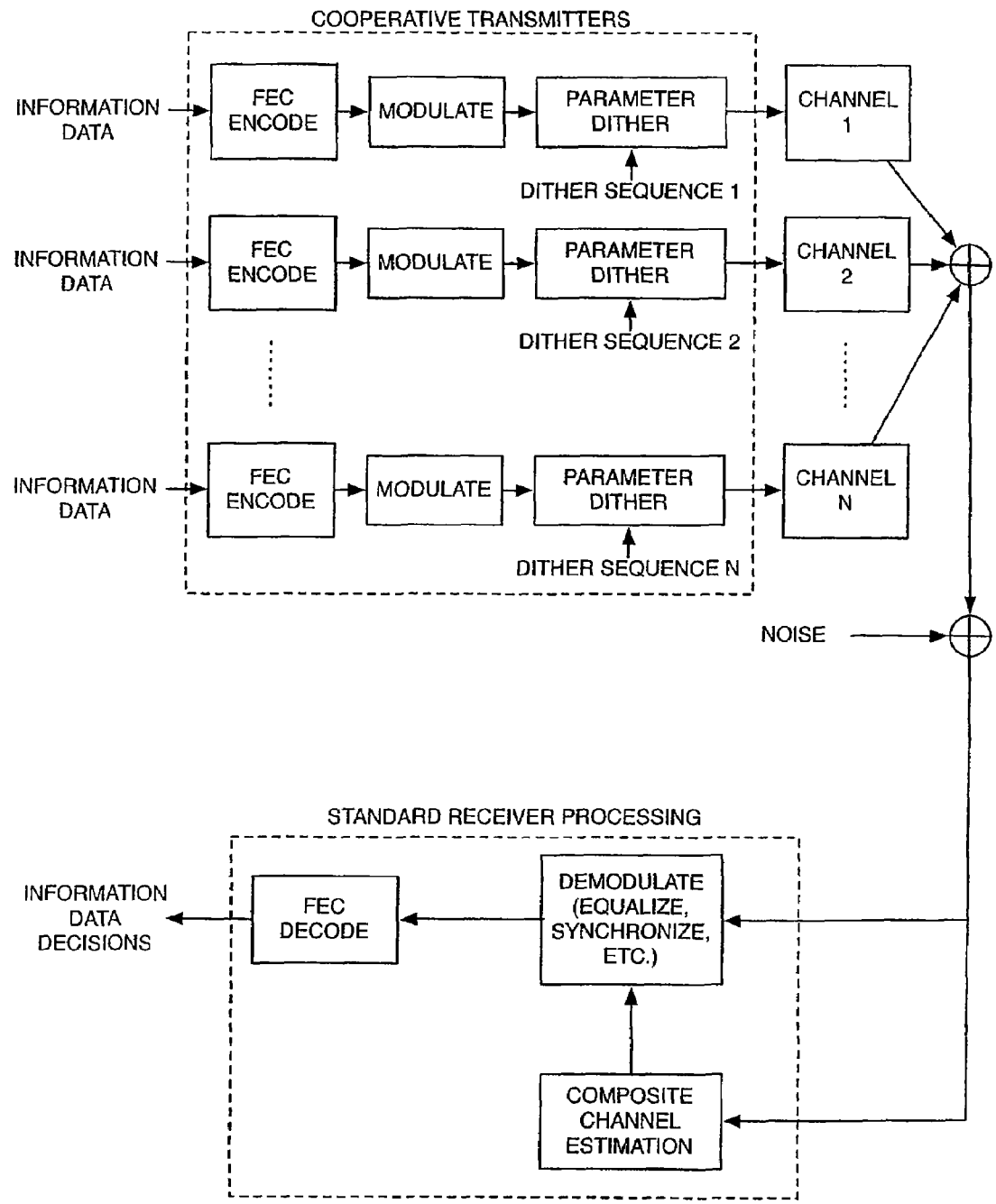
FIG. 6 shows a block diagram of a cooperative communication system using dithering, according to an embodiment of the present invention.

A block diagram of a system in accordance with an embodiment of the invention is shown in FIG. 6. Channel coding is applied to information data for data reliability enhancement. Channel coding is presented by the box "FEC ENCODE" that includes an forward error correcting (FEC) encoder. The FEC encoder comprises one of, or a combination of, a Reed-Solomon block encoder, a convolutional encoder, a concatenated RS and convolutional encoder, or a modern code such as a low density parity-check encoder, a parallel concatenated code encoder, a serially concatenated code encoder. FEC ENCODE may also include an interleaver that rearranges encoded data bits so that when the relative order of the data bits is restored to the original order at a receiver, adjacent erroneous bits occurred during the transmission are no longer adjacent, and thus the errors are easier correctable by an FEC decoder. In one embodiment, each of N cooperative transmitters encodes digital information data using the same FEC code. The FEC encoded data symbols are then modulated and applied to a parameter dither mechanism. The parameter dither mechanism may comprise a plurality of dithering modules. For example, one of the dithering modules can add a phase dither to the modulated symbols, the phase dither can be discrete values or continuous values ranging from 0 to $2\pi$. Thus, each transmitter sends the same symbol sequence but dithers the modulated signals in a manner unique to each transmitter. In addition to dithering the phase, the parameter dither mechanism may insert small variations to the modulated signal amplitude, frequency, and/or symbol timing, i.e., it may contain other dithering modules such as frequency dithering module, amplitude dithering module, and/or symbol-timing dithering module.

The composite effect of these signals is received by a destination or intermediate (hop) receiver. This composite signal includes the effects of all or most of the transmitted signals and the transmission channels between each transmitter and the receiver. The receiver then processes the received signal to extract the information data sequence. This processing includes estimation of the composite channel, demodulation of the symbols, and FEC decoding. The demodulation of the symbols may include, in part, channel equalization, frequency/phase estimation, and symbol timing synchronization.

Figure 9:
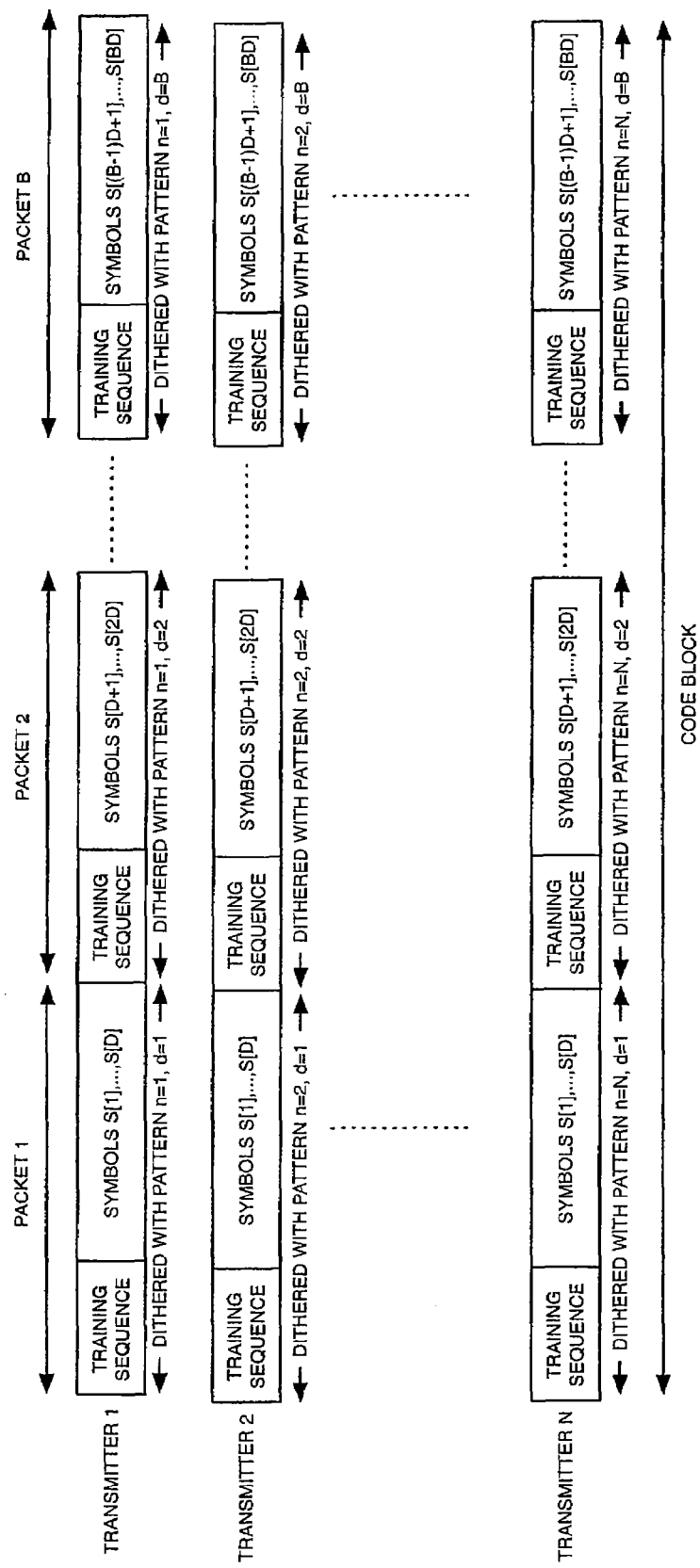
FIG. 9 shows an example of packet-based phase dithering data format, according to an embodiment of the present invention. This allows for estimation of the composite signal at the beginning of each packet with no knowledge of the number of transmitters or their dither pattern. Each node uses B dither values, for d=1, 2, . . . , B in a given code block.

There are several special cases of the present invention that simplify the receiver processing. Specifically, if the signal parameters are held constant for a number of symbols, this may simplify channel estimation. This concept is illustrated in FIG. 9 where the dither values are held constant for D symbols, D being a positive integer. In one embodiment of the present invention, the D symbols can be the encoded information data mapped to an I/Q constellation comprising an M-ary symbol alphabet, representing an M-level phase modulation (mPSK), M-level amplitude modulation (mASK), and/or M-level amplitude and phase modulation (mQAM). The block length of the FEC used is assumed to be longer than D symbols; specifically, assume that the FEC block comprises D*B modulating symbols so that the composite signal will experience B different composite channels during one FEC code block. In this case, the D symbols with constant dither values can be sent in a packet that may include a training sequence for channel estimation. In one embodiment, the training sequence may be prefixed at the start of each packet as shown in FIG. 9. In another embodiment, the training sequence may be located at a predetermined location within each packet. In yet another embodiment, the training sequence may be interspersed within a packet. The symbols and their number in the training sequence may be constant for all packets, or they may vary. All cooperating transmitters share a common information data, which was transmitted from one or more nodes of the previous hop. The common information data may be divided into a plurality of packets. Each packet includes D symbols (from an M-ary symbol alphabet); the D symbols within a packet are dithered with a constant dither value, which may be unique to that packet and to that transmitter. Thus, the B packets may use B distinct dither values. Each packet may further contain a training sequence, which can be the same to all cooperating transmitters. Nodes within the next hop may use the training sequence for channel estimation, carrier frequency recovery, carrier phase adjustment, and frame (packet) synchronization. The training sequence may be known a priori to the destination node or to nodes that cooperate within the next hop. The training sequence can be a fixed string of pattern (bits) being represented as 2 symbols 1 and −1 in the case of BPSK or 1, −1, j, and −j in the case of quadrature phase-shift keying (QPSK). The training pattern can be modulated with a M-ary (M-level) phase shift keying (mPSK), a M-ary amplitude shift keying (mASK), a M-ary phase-and-amplitude shift keying (mAPSK), and/or multi-level quadrature amplitude modulation (mQAM). The code block can generally contain large amount of information data, which can be divided into a B number of packets, B being an integer (FIG. 9). The code block can be protected with an FEC encoder such as a modern LDPC code. It is assumed that all transmitters are time synchronized in symbol time (symbol time, symbol time period, and symbol period are used alternately hereinafter), code block, and packet levels.

With this packet-level dithering, the receiver can estimate the composite channel for each packet using the training sequence. Since the dither values are constant (time-invariant) during one packet, the only change in the composite channel during a packet would be due to channel propagation factors (e.g., mobility, oscillator drift, etc). This time-variation is relatively slow and can be tracked in the receiver after initial estimation as necessary.

The value of this packet-level dithering is most apparent when considering symbol-by-symbol dithering (i.e., D=1). In this case, the composite channel will change each symbol time in a random manner. This makes it difficult to track these variations. Thus, one would need to estimate each channel from each transmitter to the receiver and at each time, with knowledge of the dither pattern of each transmitter, construct an estimate of the composite channel. This is undesirable in practice for several reasons. First, it requires a method of estimating the channel for each transmitter at the receiver. It also requires that the receiver determines the number of transmitters. Finally, it also requires that the receiver know the dither pattern of each of the transmitters.

In contrast, packet-wise dithering does not require the receiver to know the number of transmitters, the dither pattern used by each transmitter, nor the individual channels from each transmitter to the receiver. The receiver processes the received composite signal in the same fashion regardless of the number of transmitters. This is especially valuable in the context of the mobile ad-hoc network (MANET) considered in the Background Section. Specifically, as the messages propagate out from a source node, the benefits of cooperation are achieved with virtually no coordination. For example, the number of transmitters cooperating need not be known at the transmitters nor at the receivers; and multiple receivers can receive the same cooperative transmission with benefit. This is attractive in such cases where rapid robust dissemination of information is desired with significant mobility of the nodes.

The one level of coordination remaining in the proposed invention is that the transmitters are assumed to be synchronized in time. This includes synchronization at the level of FEC code block, dither packet, and symbol time. Of these, the most difficult to establish in practice is the symbol time level synchronization of the transmitters. For example, synchronization at the code block and dither packet level can be achieved through transmission of pilot signals as is often done, for example, in time-division multiple access (TDMA) systems. Symbol time synchronization is more difficult, however, because this may change due to radio mobility and/or oscillator imperfections.

The assumption of symbol time level synchronization can be relaxed at the potential cost of receiver complexity. For example, if the channels are AWGN channels, the demodulation processing is memoryless. If two cooperating transmitters are out of synchronization, then intersymbol interference (ISI) will be introduced, i.e., the composite channel will no longer be an AWGN channel but will also include ISI. Thus, the receiver should be modified to account for this ISI. The specific modification depends on the exact modulation format. In a direct sequence spread spectrum format, a RAKE receiver can be used. In a single-carrier system, an equalizer of some form should be used. In an orthogonal frequency-division multiplexing (OFDM) modulation format, a cyclic prefix has typically been employed to combat ISI caused by delay spreads. Therefore this additional ISI introduced by imperfect symbol synchronization among cooperating transmitters can be accounted for in the standard OFDM processing.

In fact, if the individual channel between each transmitter and the receiver has been modeled to include ISI, then the receiver for a non-cooperative link will include one of the above mechanisms to account for ISI. Data transmission at high speeds over such an ISI-impaired channel requires a signaling scheme which is capable of removing or at least reducing the channel distortion to a tolerable level. Channel distortion can be combated in either time or frequency domain and in several ways. One frequency domain approach is the use of OFDM modulation technique. Therefore, imperfect symbol time synchronization among the transmitters can be accommodated by the use of an appropriate modulation scheme and by an ISI-capable receiver. It is typical that the ISI receiver is designed to accommodate some delay spreads (defined as being the length of time over which all the non-negligible energy is detected at a receiver from a delta function sent at time equals to zero). The determination of delay spreads in a given environment can be simulated with a known channel model, calculated and/or measured. Measurement of power delay spreads or multipath time delays are known to one of skill in the art. In order to use this same receiver for reception of a packet-wise dithered cooperative system, one must ensure that the additional ISI introduced by imperfect symbol level synchronization does not cause significant performance degradation. Most such ISI receivers will not experience significant performance degradation when a typical ISI channel realization has its delay spread amounted to a fraction of one symbol period, or in other words, when the symbol period is significantly longer than the RMS (root-mean-square) delay spread. Therefore, in practice, synchronization within one symbol period should be sufficient for systems that have individual channels that include ISI.

Figure 10:
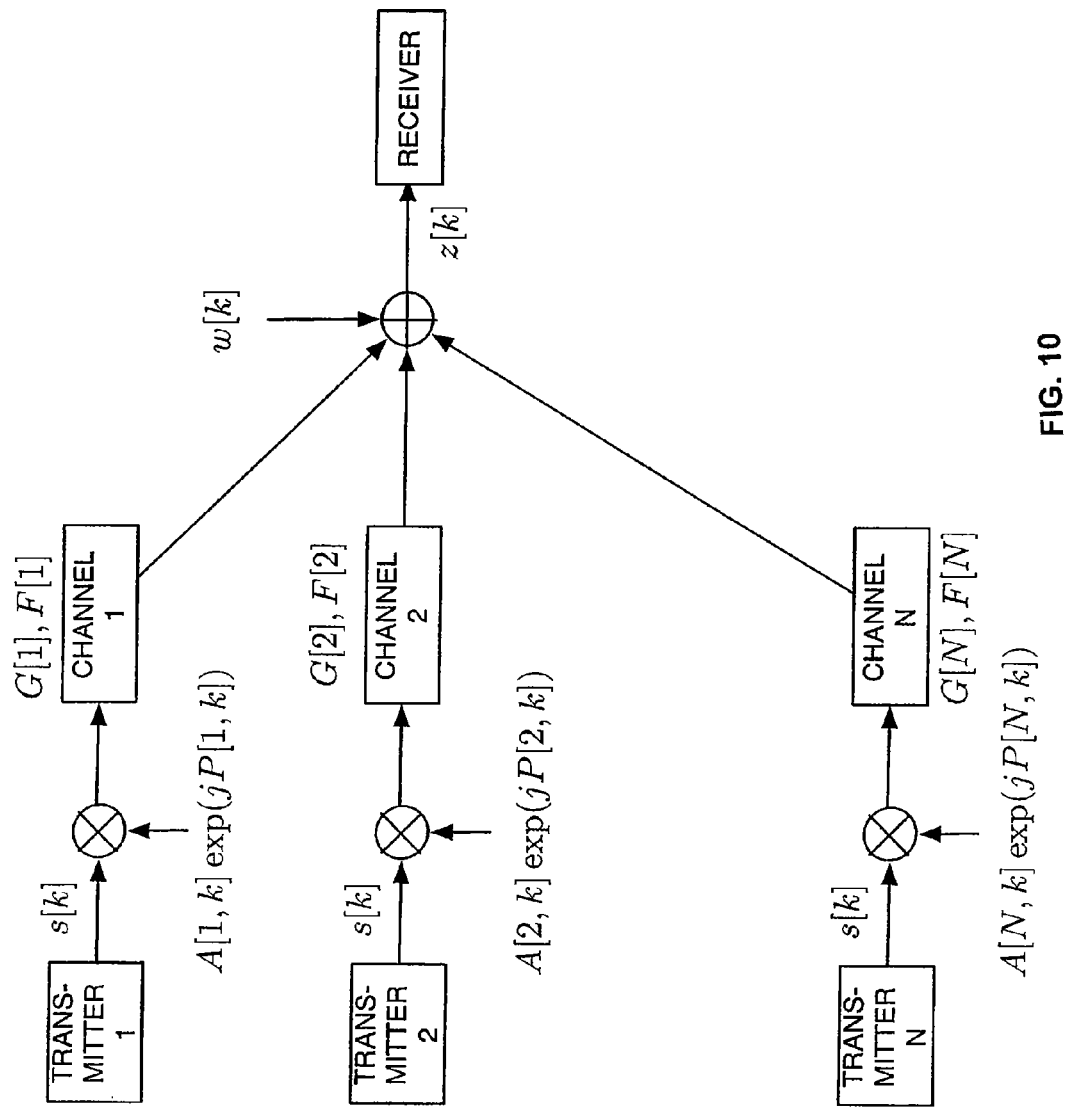
FIG. 10 shows a block diagram of phase (with possible amplitude) dithering for the AWGN channel, according to an embodiment of the present invention.

FIG. 10 shows N cooperating transmitters and a single receiver. For the purpose of illustration, a complex base-band equivalent model of both the transmitted and received signals is considered throughout. The transmitters shall transmit a common base-band modulated symbol stream with elements s[k]. Each symbol s[k] is drawn from a finite alphabet of symbols that are normalized to have unit energy on average. As an example, in the case of quadrature phase-shift keying (QPSK) with equiprobable symbols, this alphabet would simply be the 4 symbols 1, −1,j, and −j.

Each of the N cooperating transmitters in FIG. 10 constructs a signal for transmission as follows. The n-th cooperating transmitter multiplies the k-th common symbol s[k] by a dither term with gain A[n,k] and phase P[n,k]. The resulting transmission symbol is then t[n,k]=A[n,k]exp(jP[n,k])s[k]. This symbol is then transmitted over the channel with transmission power Es per symbol. Generally speaking, the symbol s[k] can be dithered with a multi-level amplitude and/or phase modulation (mQAM). For the purposes of illustration, a memoryless channel is considered presently which introduces an additional gain G[n] and phase F[n] which are user-dependent but not symbol dependent. The present invention, however, is not limited to such memoryless channels. In particular, inter-symbol interference (ISI) channels will be considered later.

The N cooperating transmitters transmit their respective k-th transmission symbol through their respective channels simultaneously so that the receiver receive the k-th receive symbol z[k], which can be expressed as:

$$z[k] = \sum_{n=1}^{N} \sqrt{E}\, A[n,k]G[n]\exp(j(P[n,k]+F[n]))s[k]+w[k] \quad (3)$$

where w[k] corresponds to additive white Gaussian noise (AWGN). Specifically, w[k] is a realization of a complex Gaussian noise process with zero-mean, variance-No/2 uncorrelated real and imaginary components. The noise samples w[k] are mutually independent for each k and independent of the transmitted symbols or number of transmitters.

Observe that component of the received symbol z[k] corresponding to each of the N cooperating transmitters shares the common symbol s[k]. Equation (3) can thus be re-expressed as:

$$z[k]=\sqrt{Es}\,C[k]\exp(jQ[k])s[k]+w[k] \quad (4)$$

In Equation (4), C[k] and Q[k] are the composite gain and phase, respectively, imposed by both the per-transmitter dithering and per-transmitter channel.

In order to assess the efficacy of the invention, an analysis of the transmission and reception models encapsulated in Equations (3) and (4) using tools from information theory will now be made. In order to aid analysis, it is assumed that i) N=2, ii) G[n]=1 for both channels, iii) F[n]=0 for both channels, iv) A[1,k]=A[2,k]=1 for all k, and v) QPSK modulation is used. The case of two users in a purely AWGN channel utilizing only phase dithering is thus considered where:

$$z[k]=\sqrt{Es}(\exp(jP[1,k])+\exp(jP[2,k]))s[k]+w[k] \quad (5)$$

Assume that the phase sequences P[1,k] and P[2,k] are known at the receiver. The receiver then knows the composite phase Q[k] and can de-rotate the received signal so that the pertinent reception model is:

$$z[k]=\sqrt{2Es}(1+\cos(P[1,k]-P[2,k]))s[k]+w[k] \quad (6)$$

The capacity of a communications channel is the maximum rate at which information can be transmitted and reliably received across that channel. Since the computation of capacity requires an optimization over all possible statistics of the transmitted symbols, it is generally difficult to compute precisely. It is common to work with the symmetric information rate (SIR) for a given modulation scheme and channel instead. SIR measures the maximum rate at which information can be transmitted and reliably received across a channel given a specific symbol alphabet and under the assumption that the symbols are equiprobable. The average SIR for the 2-user phase dithering model of Equation (6) is found by averaging the mutual information I(z[k]; s[k]) over possible values of the phase dither values P[1,k] and P[2,k] (please refer to, for example, Cover and Thomas, "Elements of Information Theory" for a detailed description of mutual information).

Figure 11:
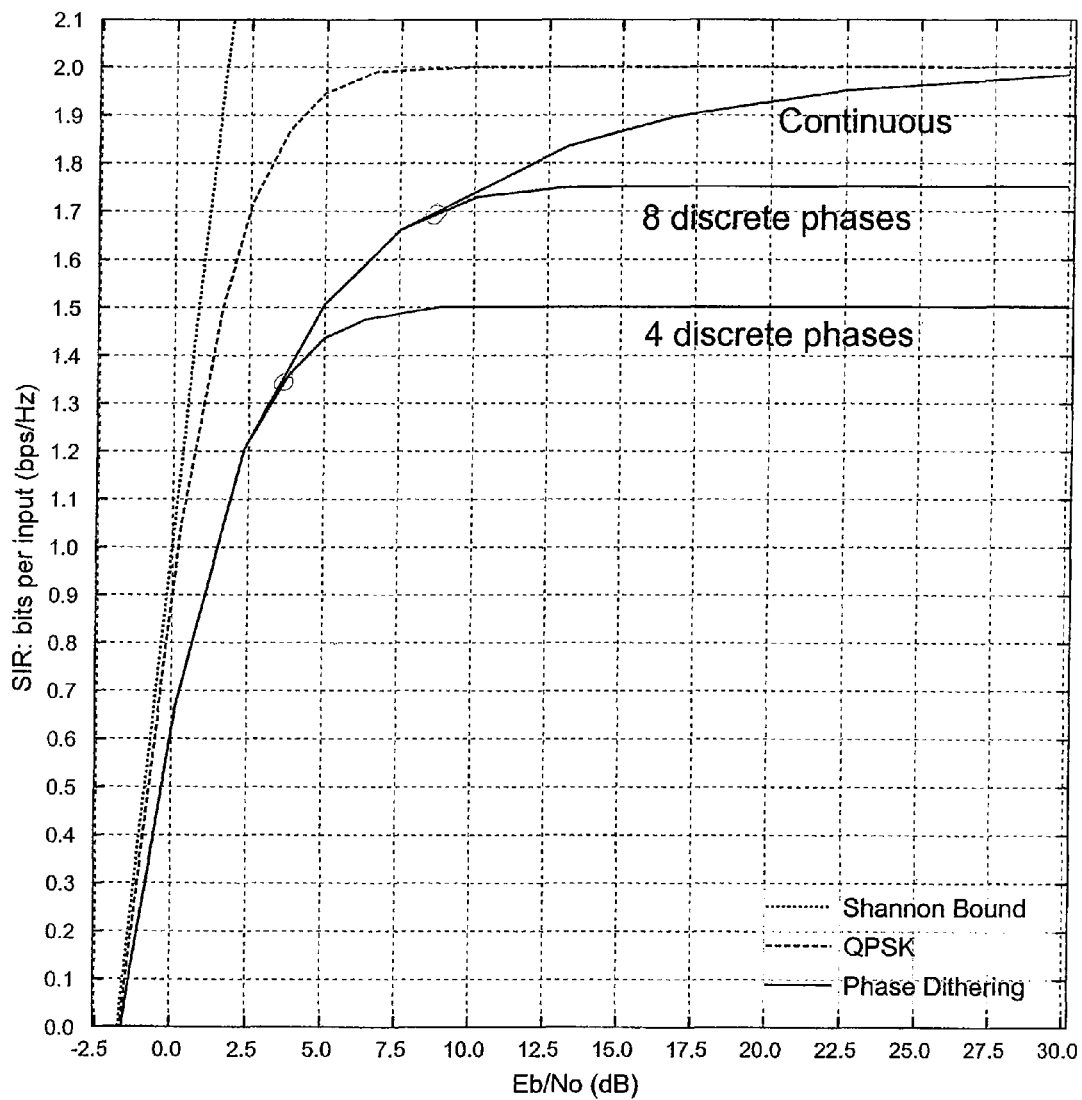
FIG. 11 shows the achievable information transfer rate using various cooperation methods. The symmetric information rate (SIR) performance is given as a function of the energy per bit (Eb) to noise spectral level ratio (in dB) for dithering with discrete and uniform phases.

FIG. 11 plots SIR vs. Eb/No (where Eb is the energy per information bit) for different transmission schemes. The "QPSK" curve corresponds to the achievable SIR with distributed beam-forming (i.e., P[1,k]=P[2,k] for all k). Since QPSK uses 4-ary alphabet, QPSK achieves an SIR of 2 bits per channel use as SNR increases. There are three "Phase Dithering" curves in FIG. 11. The curve labeled "Continuous Phase" corresponds to the case where P[1,k] and P[2,k] are drawn uniformly from all possible phase values on the interval [0,2π]. The "8 discrete phases" curve corresponds to the case where P[1,k] and P[2,k] are drawn uniformly from the 8 discrete phase values $\{0,\pi/4,\pi/2,3\pi/4, \pi,5\pi/4,3\pi/2,7\pi/4\}$. The "4 discrete phases" curve corresponds to the case where P[1,k] and P[2,k] are drawn uniformly from the 4 discrete phase values $\{0,\pi/2,\pi,3\pi/2\}$. As expected, the SIR performance for phase dithering is less than that of distributed beam-forming in this AWGN scenario. The relative Eb/No difference between phase dithering and distributed beam-forming grows with increasing SIR; however, systems employing FEC necessarily operate at lower SIR and for many code rates of practical interest, the limits on the theoretical performance between the two schemes is small. For example, a system employing a good modern code with rate ½ can expect to operate close to an SIR of 1.0 bps/Hz and at this SIR, the relative difference between continuous phase dithering and distributed beam-forming is approximately 1.5 dB. Observe in FIG. 11 that for SIR values of less than 1.35 bps/Hz, the SIR of phase dithering using only 4 discrete phases is indistinguishable from that of phase dithering using continuous phase values. Similarly, for SIR values of less than 1.7 bps/Hz, the SIR of phase dithering using only 8 discrete phases is indistinguishable from that of phase dithering using continuous phase values.

In order to further assess the efficacy of the invention, the performance of a coded system employing phase dithering will now be assessed via computer simulation. A two-transmitter, phase-dithered AWGN scenario is again considered as in the above theoretical description, however, a slightly different transmission and reception model to that considered in Equation 5 is examined. There are three important differences. First, the data symbols s[k] constitute coded BPSK symbols. Second, the transmission symbols (post-dithering) are interleaved with a channel interleaver. Third, it is assumed that there is a random phase offset introduced by the second channel so that F[2]=f (an offset that is constant across a block but changes from block-to-block). The received symbols are thus modeled as:

$$z[k]=\sqrt{2E_s}(1+\cos(P[1,k]-P[2,k]-f))s[k]+[k] \quad (7)$$

Figure 12:
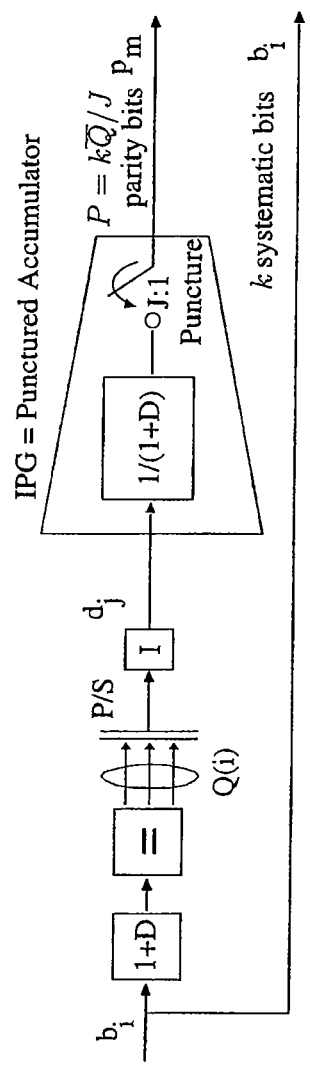
FIG. 12 shows the encoder block diagram for a flexible low density parity check code (F-LDPC), a modern code used in the simulations, according to an embodiment of the present invention. Simulations use Q(i)=2 for all i.

The modern code used is a rate ½, input block size 4096 F-LDPC (a flexible low density parity-check code designed by TrellisWare Technologies, Inc. and described in detail in K. M. Chugg, P. Thiennviboon, G. D. Dimou, P. Gray, and J. Melzer, "A New Class of Turbo-like Codes with Universally Good Performance and High-Speed Decoding," in Proc. IEEE Military Comm. Conf., Atlantic City, N.J., October 2005 is incorporated herein by reference.). FIG. 12 illustrates an encoding diagram for this code. A stream of input bits (b[i]) feeds an outer code, the output of which is interleaved (d[j]) and then fed to an inner parity generator, which generates a parity bit stream P[m]. This parity stream is then transmitted along with the systematic bit stream so that the resulting code is systematic. The outer code is formed by the serial concatenation of a 2-state convolutional code ("1+D") and a repetition code ("="). Observe that ith output of this convolutional code is repeated Q(i) times. For the code used in the present simulations, Q(i)=2 for all i. The inner parity generator (IPG) comprises an accumulator ("1/(1+D)") followed by a J:1 puncture. For the code used in the present simulations, J=2. Both the channel interleaver and code interleaver are high sum-spread pseudo-random interleavers.

Figure 13:
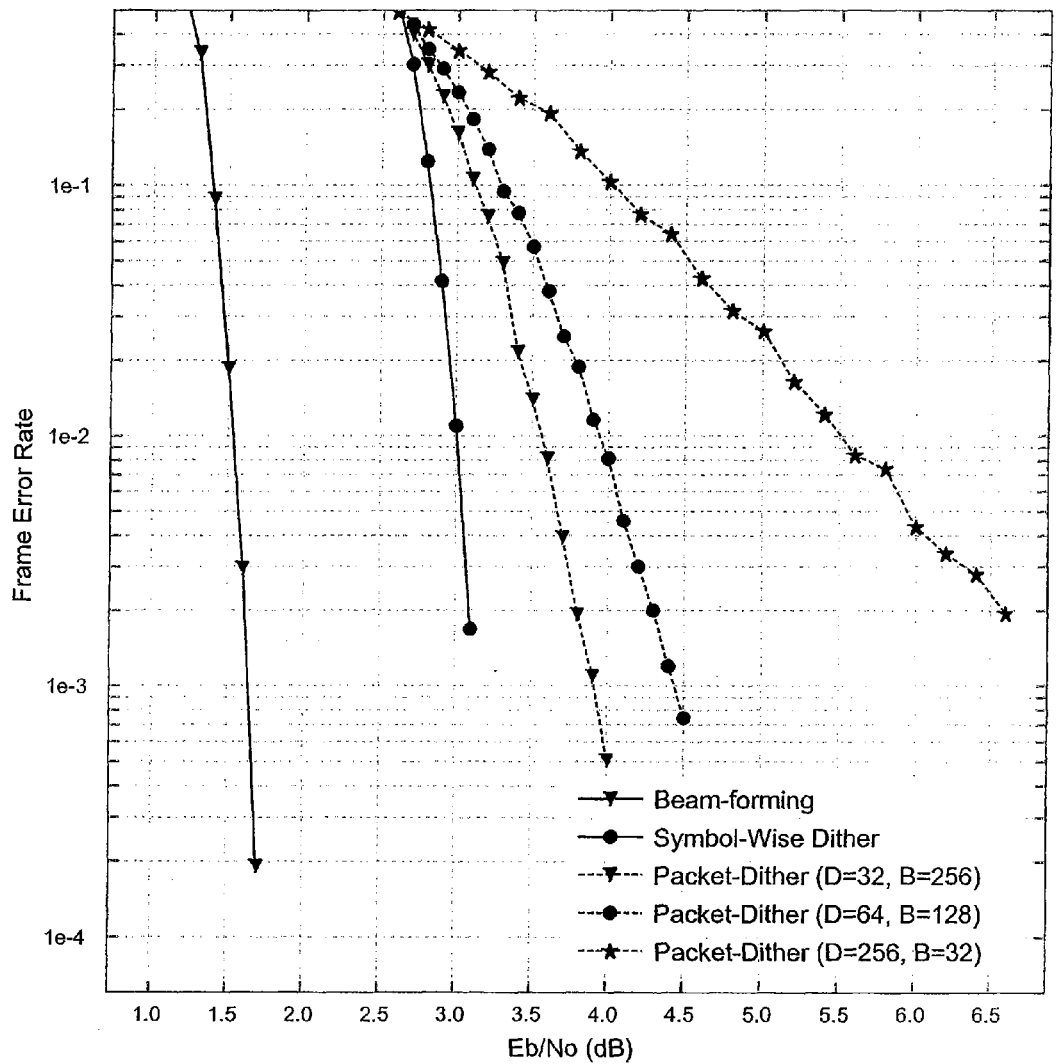
FIG. 13 shows a comparison of phase-dithering and ideal distributed beam-forming cooperative communications for two transmitters. Performance of phase dithering approaches for different packet lengths are shown, including symbol-wise dithering.
Figure 14:
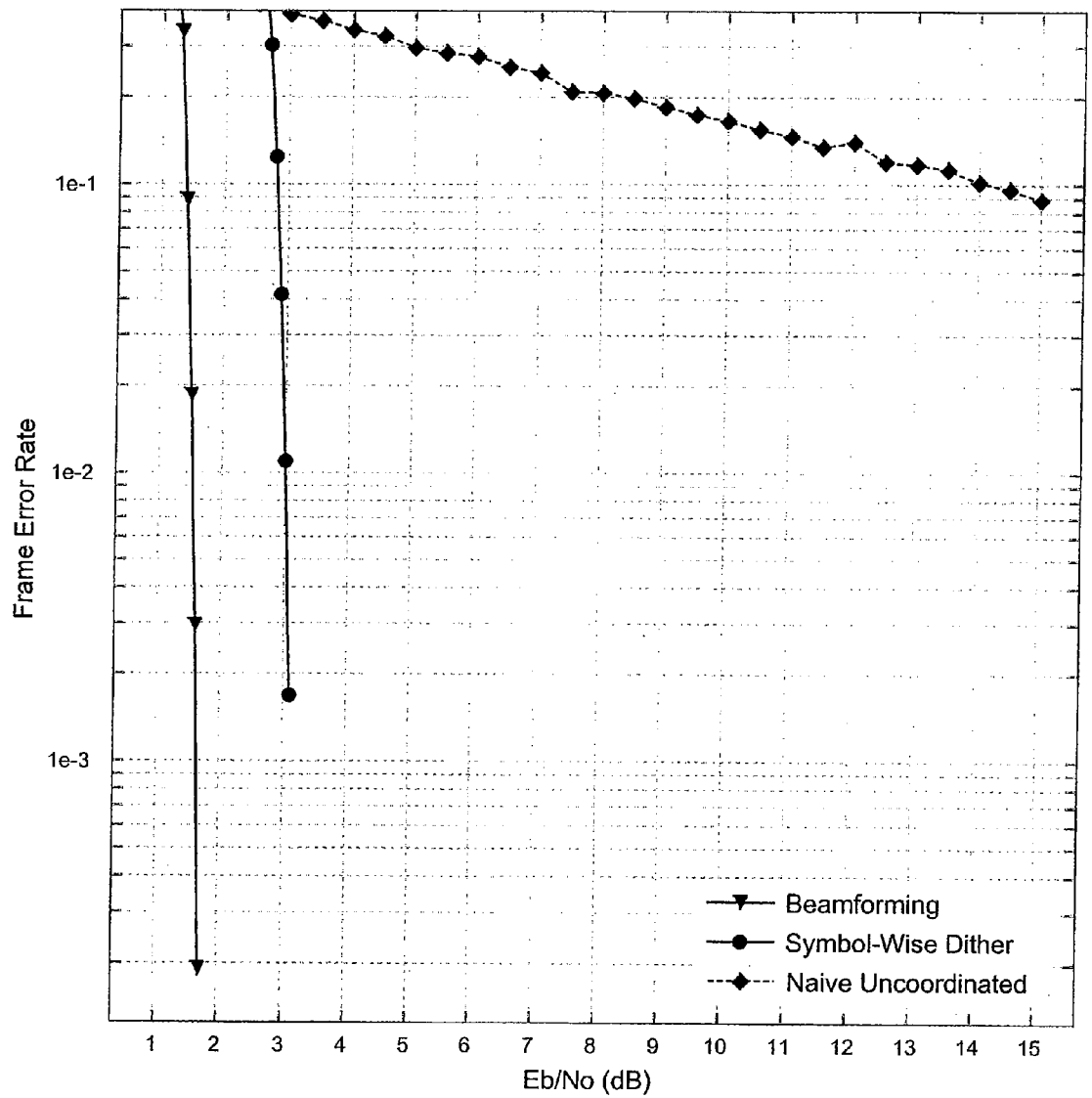
FIG. 14 shows a comparison of symbol-wise phase-dithering, ideal distributed beam-forming, and naive uncoordinated cooperative communications for two transmitters.

FIG. 13 compares the performance of 5 transmission schemes. The curve labeled "Ideal Coop Diversity" corresponds to the case where and P[1,k]=P[2,k]+f for all k (i.e., distributed beam-forming). The curve labeled "Symbol-Wise Dither" corresponds to the case where P[1,k] and P[2,k] are chosen independently for each value of k (and uniformly on the interval [0,2π]). The curves labeled "Packet-Dither (D=32)", "Packet-Dither (D=64)", and "Packet-Dither (D=256)", correspond to the case where P[1,k] and P[2,k] are chosen independently for packets of length D=32, 64, and 256, respectively (and uniformly on the interval [0,360 degree]). Observe first that the approximate 1.5 dB performance degradation of the "Symbol-Wise Dither" curve with respect to the "Ideal Coop Diversity" case is consistent with the SIR results above. Observe second that the performance degradation of packet-wise dithering with respect to symbol-wise dithering is tolerable for D=32 and D=64 but becomes more pronounced for larger values of P due to the fact that as P increases the amount of diversity introduced by dithering decreases. FIG. 14 re-illustrates the "Ideal Coop Diversity" and "Symbol-Wise Dither" curves along with the extreme packet-wise dithering case of D=8192 so that that P[1,k] and P[2,k] are constant for the whole code block. This extreme case corresponds to the naive uncoordinated approach.

Figure 15:
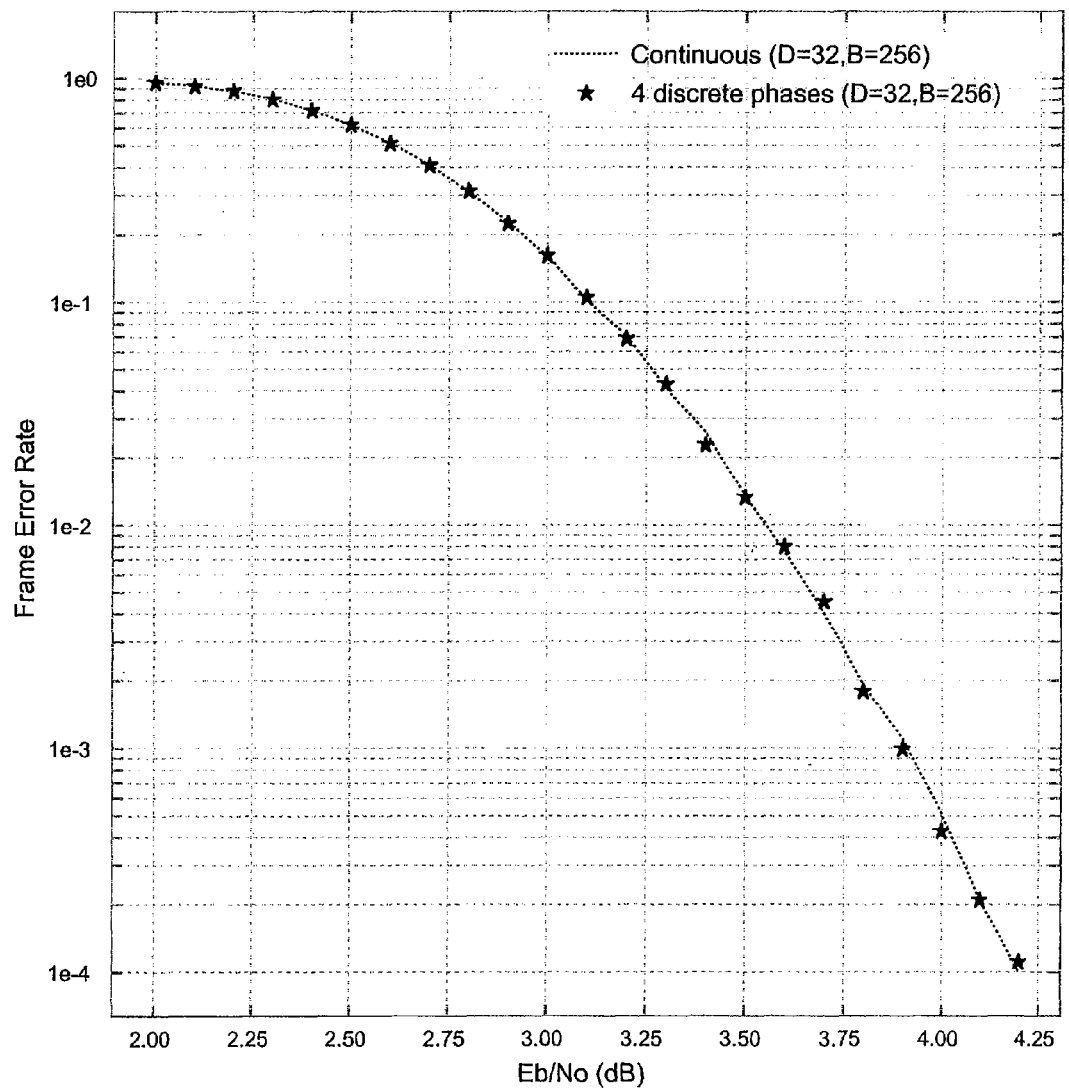
FIG. 15 shows a comparison of continuous phase dithering and discrete phase dithering with 4 dither values with a packet length of D=32.

FIG. 15 re-illustrates the "Packet-Dither (D=32)" curve of FIG. 13 with the caption "Continuous (D=32)" to indicate that the phase dither values P[1,k] and P[2,k] are drawn uniformly on the interval [0, 360 degrees]. This curve is compared to similar scenario where the phase dither values are drawn uniformly from the 4 values $\{0,\pi/2,\pi,3\pi/2\}$. As expected from the SIR discussion above, the performance difference between the "Continuous (D=32)" and "4 discrete phases (D=32)" curves are negligible.

Even in the case of packet-wise dithering time-synchronization is required. In fact, all of the previous signal models are based on the assumption of such synchronization. The models assume that the received signal has been matched-filtered using Nyquist pulse shaping to avoid ISI when transmitting over an AWGN channel. The resulting model represents the symbol-spaced matched-filter output. A similar model is obtained if one oversamples a filtered version of the received signal. Specifically, if one samples the received signal with sample time less than one symbol time a model similar to that in Equation (3) will occur with multiple samples per symbol index (k). In that case, pulse matched filtering can be performed in discrete time.

A more general model is obtained by considering the continuous time observation with possible intersymbol interference (ISI) for each channel from transmitter to receiver. Specifically, we have $$r(t) = \sum_{n=1}^{N} \sum_{k=1}^{K} \sqrt{E_s} A[n,k] s[k] h(n; t - kT - v[n]) + w(t) \quad (8)$$

where w(t) corresponds to additive white Gaussian noise (AWGN), h(n; t) is the combination of the pulse filtering and the channel impulse response from transmitter n to the receiver, and v[n] is a relative transmission delay. The model in Equation (3) arises by assuming that h(n; t)=G[n]p(t)exp (jP[n,k]), where p(t) is a Nyquist pulse shape, v[n]=0. Specifically, assuming that there is no relative delay between the reception of different transmissions, if one match-filters to the pulse p(t) and samples at integer multiples of the symbol period T, one arrives at the model in Equation (3).

Note however, for a channel that causes ISI, as is often the case in multipath channels with sufficiently large transmission bandwidth, h(n; t) will not be equal to p(t). In this case, h(n; t) will be nonzero for several symbol periods. Specifically, assume that h(n; t) is nonzero for t between 0 and LT for all n. Here LT is the delay spread and L is the normalized delay spread. Assume further that the transmitters are synchronized within one symbol period T, then v[n] is between 0 and T for each n. It is then possible to express Equation (8) as $$r(t) = \sum_{k=1}^{K} \sqrt{E_s} s[k] A[n,k] c(t - kT) + w(t) \quad (9)$$

where c(t) is the composite ISI channel given by $$c(t) = \sum_{n=1}^{N} h(n; t - v[n]) \quad (10)$$

Because of the added delays induced by only rough time synchronization between the transmitters (i.e., the presence of v[n]), c(t) will be nonzero from 0 to (L+1)T. In other words, synchronizing the transmitter within one symbol period induces one more symbol of delay spread. More generally, synchronizing the transmitters within q symbol periods induces q more symbols of delay spread. Thus, if the receiver is designed to operate in the presence of this much ISI, no finer time synchronization is required.

The above cited embodiments are merely illustrations of the principles of the invention. A person skilled in the art can introduce various modifications and enhancements without departing from the spirit and scope of this invention, which is embodied in the following claims.

What is claimed is:

1. A cooperative communication system for communicating information in a multiple-node environment comprising:
    at least one source transmitter sending information data;
    a plurality of transceivers working in cooperation, with each transceiver receiving the information data, modulating the information data, dithering the modulated information data using a dithering pattern that is unique for each transceiver, and relaying the modulated and dithered information data; and
    at least one sink receiver receiving a composite signal comprising the modulated and dithered information data relayed from at least a portion of the plurality of transceivers,
    wherein dithering the modulated information data comprises inserting variations to signal parameters of the modulated information data.

2. The cooperative communication system of claim 1 wherein the modulated and dithered information data comprises a B number of packets, with each packet including a D number of symbols, where the B number and the D number are positive integers.

3. The cooperative communication system of claim 2 wherein each one of the B number of packets is dithered with a constant (time-invariant) dither value.

4. The cooperative communication system of claim 1 wherein each one of the plurality of transceivers computes a cyclic redundant check (CRC) on the received information data for verifying an error-free reception.

5. The cooperative communication system of claim 1 wherein each one of the plurality of transceivers further comprises:
    a forward error correction (FEC) encoder for encoding the received information data; and
    a training pattern generator for adding a training sequence to each packet.

6. The cooperative communication system of claim 5 wherein the FEC encoder is one of the Reed-Solomon block code, a convolutional code, or a low density parity-check code.

7. The cooperative communication system of claim 5 wherein the training sequence is the same for the plurality of transceivers working in cooperation.

8. The cooperative communication system of claim 1 wherein the dithering pattern for each of the plurality of transceivers is generated using a pseudo-random number generator or pseudo-noise generator having a plurality of distinct dithering values.

9. The cooperative communication system of claim 8 wherein the modulated and dithered information data comprises a B number of packets, and a first dithering value of the plurality of distinct dithering values is coupled to a first packet of the B number of packets.

10. The cooperative communication system of claim 8 wherein the pseudo-random number generator is implemented as a linear feedback shift register having an initialization seed.

11. The cooperative communication system of claim 10 wherein the initialization seed is stored in a memory.

12. The cooperative communication system of claim 11 wherein the memory is one of the ROM, EPROM, EEPROM, SRAM, Flash memory or registers.

13. The cooperative communication system of claim 10 wherein the initialization seed is user configurable.

14. The cooperative communication system of claim 1 wherein the dithering pattern comprises a plurality of dithering patterns.

15. The cooperative communication system of claim 14 wherein a first dithering pattern is a phase dithering pattern.

16. The cooperative communication system of claim 15 wherein the phase dithering pattern comprises a plurality of discrete phase values.

17. The cooperative communication system of claim 14 wherein a second dithering pattern is an amplitude dithering pattern having a plurality of discrete amplitude values.

18. The cooperative communication system of claim 14 wherein a third dithering pattern is a symbol-time dithering pattern having a plurality of discrete symbol-time values.

19. The cooperative communication system of claim 14 wherein a fourth dithering pattern is a phase-and-amplitude dithering pattern.

20. The cooperative communication system of claim 1 wherein the at least one sink receiver is configured to capture the composite signal having a training sequence and estimate a channel response based on a portion of the training sequence.

21. The cooperative communication system of claim 2 wherein each of the plurality of transceivers further comprises a forward error correction (FEC) encoder for encoding the received information data, the FEC encoder using a block length in symbols that is longer than the D number of symbols.

22. The cooperative communication system of claim 1 wherein the composite signal has a time-varying signal-to-noise ratio (SNR).

23. A method of relaying information in a cooperative network having a plurality of nodes, the network including at least one source node transmitting information data, a plurality of hop-nodes working in cooperation, and at least one destination node, the method comprising:
   at each one of the plurality of hop-nodes, receiving the information data, modulating the information data, and dithering the modulated information data using a dithering pattern that is unique for each one of the plurality of hop-nodes;
   at each one of the plurality of hop-nodes, transmitting the modulated and dithered information data; and
   at the at least one destination node, receiving a composite signal comprising the modulated and dithered information data from at least a portion of the plurality of hop-nodes,
   wherein dithering the modulated information data comprises inserting variations to signal parameters of the modulated information data.

24. The method of claim 23, wherein the method further comprises, at each one of the plurality of hop-nodes:
   encoding the received information data with an FEC (forward error correction) code;
   mapping the encoded information data into an ensemble of symbols;
   dividing the ensemble of symbols into a plurality of packets, wherein each packet includes a plurality of symbols; and
   inserting a training sequence to each one of the plurality of packets.

25. The method of claim 24 wherein the FEC code is a low density parity-check code.

26. The method of claim 24 wherein the training sequence is the same for each packet.

27. The method of claim 24 wherein the training sequence is known a priori to the at least one destination node.

28. The method of claim 24 wherein the dithering of the information data is performed at each one of the plurality of packets, each packet being associated with a distinctively unique time-invariant dither value.

29. The method of claim 23 wherein the modulating of the information data comprises a multi-level phase and/or amplitude modulation (mQAM).

30. The method of claim 29 wherein the mQAM modulation is one of: binary phase shift keying (BPSK), quadrature phase shift keying (QPSK), multi-level phase shift keying (mPSK), and multi-level amplitude shift keying (mASK).

31. The method of claim 23 wherein the dithering is a phase dithering having discrete phase values.

32. The method of claim 23 wherein the dithering is an amplitude and phase dithering.

33. The method of claim 23 wherein the dithering comprises a pseudo-random number generator.

34. The method of claim 23 wherein the method further comprises, at the destination node:
   a) receiving the composite signal;
   b) processing a training sequence portion of a first packet to estimate a channel response;
   c) demodulating the plurality of symbols in the first packet;
   d) repeating the steps of b) and c) until the plurality of packets are demodulated; and
   e) FEC decoding the plurality of packets to obtain a original transmitted information data.

35. The method of claim 24 wherein the received information data is encoded with the FEC code using a block length in symbols that is longer than any one of the plurality of packets.

36. The method of claim 23 wherein the composite signal has a time-varying signal-to-noise ratio (SNR).

* * * * *